United States Patent
Koskey, Jr.

(10) Patent No.: US 6,866,007 B1
(45) Date of Patent: Mar. 15, 2005

(54) HEATED BIRD PERCH

(75) Inventor: James Donald Koskey, Jr., Manitou Springs, CO (US)

(73) Assignee: K & H Manufacturing, Inc, Colorado Springs, CO (US)

( * ) Notice: Subject to any disclaimer, the term of this patent is extended or adjusted under 35 U.S.C. 154(b) by 74 days.

(21) Appl. No.: 10/320,973

(22) Filed: Dec. 17, 2002

(51) Int. Cl.$^7$ ............................................. A01K 31/12
(52) U.S. Cl. ....................................... 119/468; 119/531
(58) Field of Search ................................ 119/468, 346, 119/537, 318, 308, 319, 903, 467, 73, 464, 246; 132/232, 234; 219/523

(56) References Cited

U.S. PATENT DOCUMENTS

| | | | | |
|---|---|---|---|---|
| 1,061,225 A | * | 5/1913 | Cunningham | 607/94 |
| 1,331,908 A | | 2/1920 | Frey | 119/26 |
| 1,621,424 A | | 3/1927 | McGinnis | |
| 2,067,102 A | * | 1/1937 | Simon | 219/205 |
| 2,256,259 A | | 9/1941 | Forsyth | |
| 2,413,176 A | * | 12/1946 | Deaton | 219/521 |
| 2,460,509 A | * | 2/1949 | Keller | 219/436 |
| 2,722,596 A | * | 11/1955 | Drouet | 219/201 |
| 2,756,720 A | | 7/1956 | Richmond et al. | 119/26 |
| 2,796,043 A | | 6/1957 | Albert | 119/26 |
| 2,839,027 A | | 6/1958 | Lanza | 119/26 |
| 2,839,660 A | * | 6/1958 | Davies | 219/534 |
| 3,092,076 A | | 6/1963 | Novello | 119/26 |
| 3,107,289 A | * | 10/1963 | Willinger | 219/489 |
| 3,200,789 A | | 8/1965 | Danowitz | 119/25 |
| 3,564,589 A | * | 2/1971 | Arak | 392/498 |
| 3,636,312 A | * | 1/1972 | Dreher et al. | 219/523 |
| 4,029,110 A | * | 6/1977 | Hyland | 132/232 |
| 4,124,793 A | * | 11/1978 | Colman | 219/523 |
| 4,249,065 A | * | 2/1981 | Malone | 219/220 |
| 4,315,143 A | * | 2/1982 | Willinger et al. | 219/523 |
| 4,327,281 A | * | 4/1982 | Jager et al. | 219/523 |
| 4,477,716 A | * | 10/1984 | Thaler et al. | 219/225 |
| 4,731,519 A | * | 3/1988 | Dieterle et al. | 219/225 |
| 4,908,501 A | * | 3/1990 | Arnold, III | 219/438 |
| 4,975,562 A | * | 12/1990 | Friedman | 219/523 |
| 5,315,957 A | | 5/1994 | Garay et al. | 119/24 |
| 5,392,380 A | * | 2/1995 | Tsai | 392/498 |
| 5,465,014 A | * | 11/1995 | Avvisati | 307/117 |
| 5,588,397 A | * | 12/1996 | Johnakin, III | 119/468 |
| 5,905,849 A | * | 5/1999 | Ito | 392/498 |
| 6,374,772 B1 | * | 4/2002 | Brandt | 119/57.8 |

* cited by examiner

Primary Examiner—Yvonne R. Abbott
(74) Attorney, Agent, or Firm—Law Office of Dale B. Halling, LLC

(57) ABSTRACT

A heated bird perch includes a cylindrical housing having a first end and a second end. The second end has a flange with a threaded member extending from the flange. The cylindrical housing is formed of a heat conductive material. An electrical heating element is encased in the cylindrical housing. A temperature sensor is encased in the cylindrical housing. A controller is coupled to the temperature probe and to the electrical heating element. The controller is preset to maintain a fixed temperature. A plug is placed inside an exposed end of the threaded member.

16 Claims, 2 Drawing Sheets

HEATED BIRD PERCH

FIELD OF THE INVENTION

The present invention relates generally to the field of bird perches and more particularly to a heat bird perch.

BACKGROUND OF THE INVENTION

A major cause of illness and death in pet birds is from drafts and chills. Birds lose up to 90% of their body heat through their feet. The rest of their body is covered by, a wonderful insulator, feathers. The traditional way to keep birds warm is to cover the cage with a cover. However, this does not warm the bird it just prevents drafts. In addition, it limits the light to the bird. Another solution has been to place heat lights near the cage. Unfortunately, this results in the bird having a skewed sense of night and day and the heat lamp will create its own convection currents. These currents or drafts commonly result in the bird being either over heated or too cool. Another solution has been to blow warm air on the bird through a perch. Again this results in drafts and the bird may get its nails stuck in the air slots in the perch. None of these solutions provide warmth directly to the area where the bird loses most of its heat, its feet. In addition, heat lamps and air blowers tend to reduce the humidity in the air which may result in respiratory problems for the bird.

Thus there exists a need for a heated bird perch that does not result in drafts, provides warmth to the bird's feet and does not alter the bird's sense of night and day.

SUMMARY OF INVENTION

A heated bird perch that overcomes these and other problems has an electrical heating element. A thermally conductive housing completely encases the electrical heating element. A clamp is attached to the thermally conductive housing. In one embodiment, the thermally conductive housing is water resistant. In another embodiment, the thermally conductive housing is water tight.

In one embodiment, the clamp includes a threaded member, a flange next to the thermally conductive housing, and a washer. In another embodiment, the flange is a washer.

In one embodiment, a temperature of the thermally conductive housing is preset and fixed. In one aspect of the invention, the temperature of the thermally conductive housing is approximately constant over a length of the housing.

In one embodiment, a heated bird perch has a housing formed in the shape of a perch. A heat source for the housing is contained inside of the housing. An attachment mechanism is connected to the housing. In one embodiment, the housing is formed of aluminum.

In another embodiment, the heat source has a high specific heat capacity. In one embodiment, the housing has a flange at an end the thermally conductive housing. In one embodiment, the housing is water proof. In one aspect of the invention, a portion of the housing extends outside of a bird cage when mounted on the bird cage.

In one embodiment, the heat source is an electrical heating element. In another embodiment, a temperature sensor is attached to the housing and is coupled the electrical heating element.

In one embodiment, a heat bird perch includes a cylindrical housing having a first end and a second end. The second end has a flange with a threaded member extending from the flange. The cylindrical housing is formed of a heat conductive material. An electrical heating element is encased in the cylindrical housing. A temperature sensor is encased in the cylindrical housing and coupled to the electrical heating element. The temperature sensor is preset to maintain a fixed temperature. A plug is placed inside an exposed end of the threaded member.

DETAILED DESCRIPTION OF THE DRAWINGS

Figure 1:
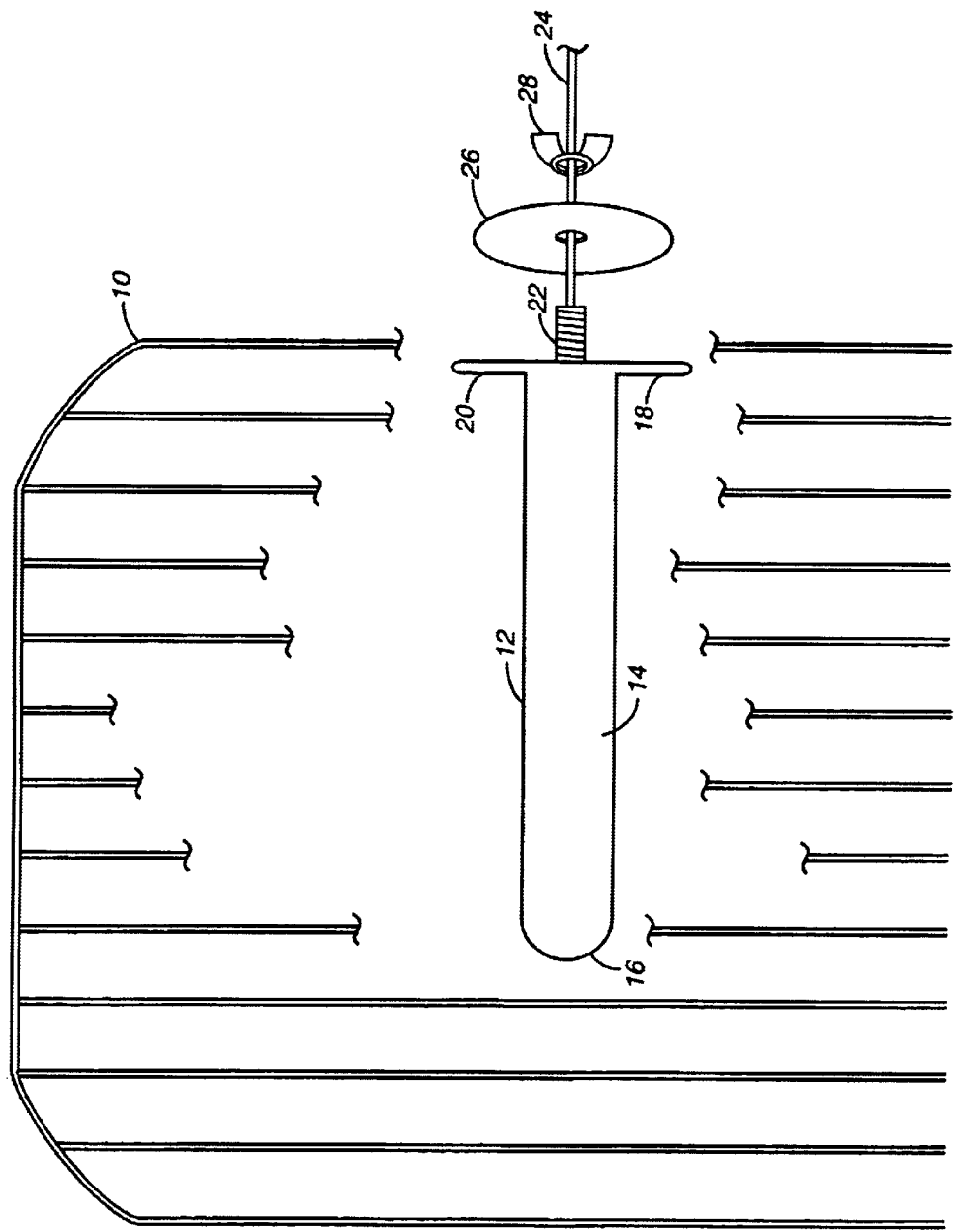
FIG. 1 is a view of a bird cage with a heated bird perch in accordance with one embodiment of the invention.

FIG. 1 is a view of a bird cage 10 with a heated bird perch 12 in accordance with one embodiment of the invention. The heated bird perch 12 has a solid housing 14 having a first end 16 and a second end 18. A flange 20 is formed about the second end 18 of the housing 14. In one embodiment, the flange 20 is not part of the housing 14, but a washer. A portion 22 of the housing extend outside of the cage 10. In one embodiment this extension is a threaded member 22. A power cord 24 extends through hole in the threaded member 22. A washer 26 slips over the threaded member 22 and a nut 28 screws onto the threaded member 22. The washer 26, threaded member 22, flange 20 and nut 28 form an attachment mechanism. Other attachment mechanisms may be used and are considered within the scope of the invention.

A heat source is encapsulated in the housing 14. In one embodiment, the heat source is an electrical heating element. In another embodiment, the heat source is material that has a high specific heat capacity for instance it may have a specific heat capacity above 0.5 Kcal/Kg° C. In one embodiment, the material should be capable of being heated by a microwave. Another method of heating may include setting the perch in a hot water or a chemical reaction. One example of this type of material is water. However, the preferred method of heating is an internal electrical heating element.

The housing 14 should be made of a thermally conductive material. For example, die cast aluminum. However, it may also be a plastic, ploy-resin or any other non-toxic, non-chewable, indestructible material. Note that since the housing is a fairly small amount of material many materials may qualify to provide sufficient thermal conductivity. The material must provide an essentially uniform temperature across the perch 12. The uniform temperature eliminates any drafts caused by the perch, but also allows the manufacturer to know that a bird will receive the right amount of heat. This also allows the perch to be used by multiple birds and the user knows they are all receiving the appropriate amount of warmth. The bird will receive most of the warming heat by the heat radiating into the birds feet and being spread through its body by its own circulation system. In addition, the housing should not have any slits or opening in which a bird's nails may get caught. In one embodiment, the housing is water resistant in another embodiment, the housing is water tight. This allows the user to easily clean the perch and makes the perch more sanitary.

The flange 20 is not only part of the attachment mechanism, but it provides protection from the bird attempting to peck at the cord 24. This is also true of the portion 22 of the housing extending outside of the cage 10.

Figure 2:
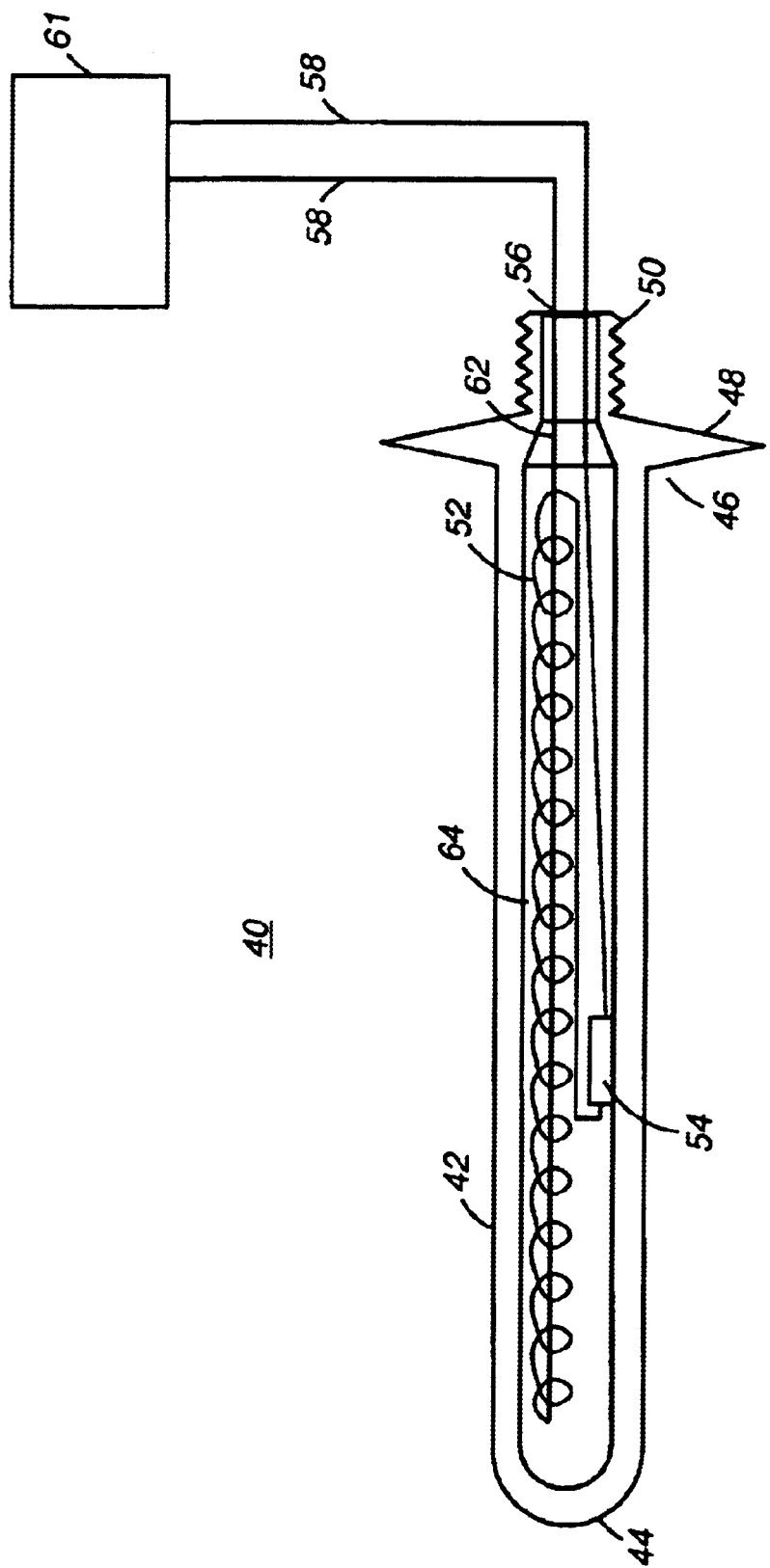
FIG. 2 is a schematic cross sectional view of a heated bird perch in accordance with one embodiment of the invention.

FIG. 2 is a schematic cross sectional view of a heated bird perch 40 in accordance with one embodiment of the invention. The heated bird perch 40 has a cylindrical housing 42 having a first end 44 and a second end 46. The second end 46 has a flange 48 with a threaded member 50 extending from the flange 48. The cylindrical housing 42 is formed of heat conductive material. An electrical heating element 52 is encased in the cylindrical housing 42. A temperature sensor 54 is also encased in the cylindrical housing 42. In one embodiment, the temperature sensor 54 is inside of the housing 42. In another embodiment, the temperature sensor 54 may be part of the heating element 52. The wires 58 for the heating element 52 and the temperature sensor 54 extend out through an opening 56 in the threaded member 50. The wires 58 are coupled to the power supply 61. In one embodiment the power supply 61 is transformer.

In one embodiment, a plug 62 covers the opening 56. The plug 62 may be an epoxy in one embodiment. In another embodiment, the interior 64 is filled with a thermally conductive member after the temperature sensor 54 and the heating element 52 are in place.

The temperature sensor 54 will generally be set to a fixed temperature by the manufacturer and not be adjustable. This ensures that the consumer does not set the temperature to high or low based on their empirical information. The temperature sensor 54 determines the temperature and acts as a switch. Thus the perch's temperature is thermostatically controlled. Note that the heated perch is not meant to be the only perch in a cage 10.

Thus there has been described a heated bird perch that provides a uniform radiate heat to a bird's feet. The warm is then circulated throughout the bird by the bird's circulatory system. The heated bird perch does not cause any drafts, is easily cleaned and has a solid housing for easy cleaning.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A heated bird perch, comprising:
   an electrical heating element;
   a temperature sensor coupled to the electrical heating element;
   a thermally conductive housing completely encasing the electrical heating element; and
   a clamp attached to an end of the thermally conductive housing capable of a holding the housing to a bird cage.

2. The heated bird perch of claim 1, wherein the thermally conductive housing is water resistant.

3. The heated bird perch of claim 1, wherein the thermally conductive housing is water tight.

4. The heated bird perch of claim 1, wherein the clamp includes a threaded member, a flange next to the thermally conductive housing, and a washer.

5. The heated bird perch of claim 4, wherein the flange is a washer.

6. The heated bird perch of claim 1, wherein a temperature of the thermally conductive housing is preset and fixed.

7. The heated bird perch of claim 6, wherein the temperature of the thermally conductive housing is approximately constant over a length of the housing.

8. A heated bird perch, comprising:
   a housing formed in the shape of a perch, wherein the housing is a thermal conductor;
   a heat source for the housing, contained inside of the housing;
   a temperature sensor coupled to the heating source; and
   an attachment mechanism connected to an end of the housing capable of a holding the housing to a bird cage.

9. The heated bird perch of claim 8, wherein the housing is formed of aluminum.

10. The heated bird perch of claim 9, wherein the heat source has a high specific heat capacity.

11. The heated bird perch of claim 8, wherein the housing has a flange at an end the thermally conductive housing.

12. The heated bird perch of claim 11, wherein the housing is water proof.

13. The heated bird perch of claim 8, wherein a portion of the housing extends outside of a bird cage when mounted on the bird cage.

14. The heated bird perch of claim 8, wherein the heat source is an electrical heating element.

15. The heated bird perch of claim 14, further including a temperature sensor attached to the housing and the electrical heating element.

16. A heated bird perch, comprising:
   a cylindrical housing has a first end and a second end, the second end having flange with a threaded member extending from the flange, the cylindrical housing being formed of a heat conductive material;
   an electrical heating element encased in the cylindrical housing;
   a temperature sensor encased in the cylindrical housing and coupled to the electrical heating element; and
   a plug inside an exposed end of the threaded member.

* * * * *